Dec. 25, 1928.  
J. HLAVKA  
1,696,680  
PLANT GUARD FOR CULTIVATORS  
Filed Dec. 23, 1927
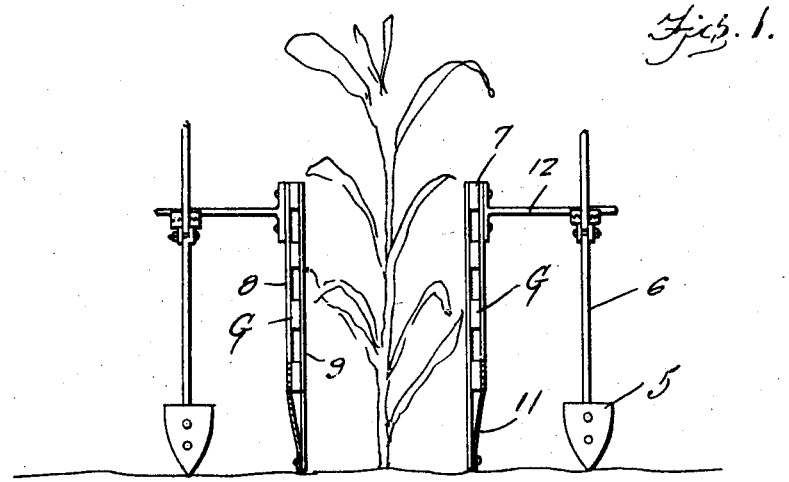
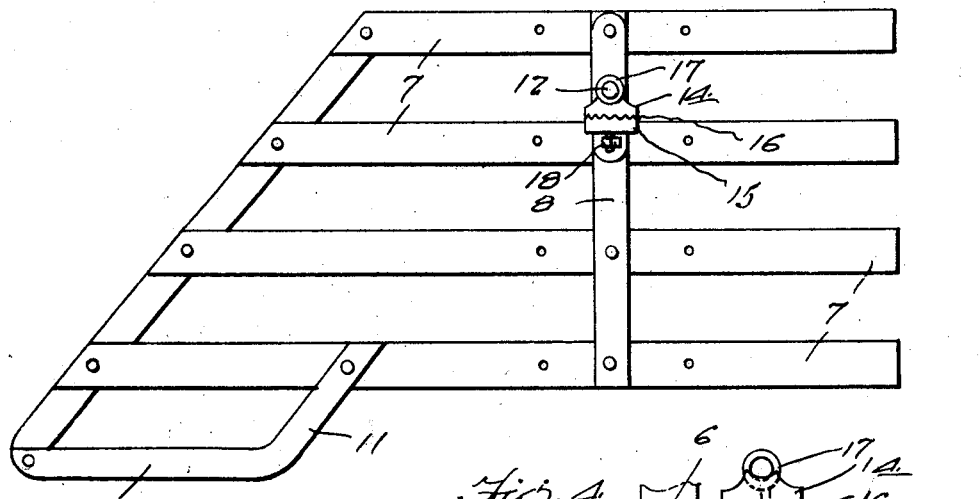
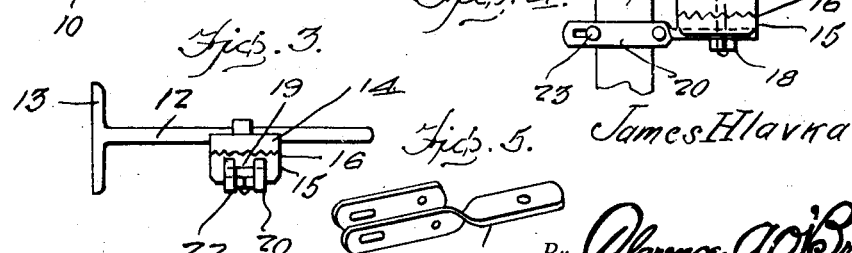
Inventor  
James Hlavka  
By Clarence A. O'Brien  
Attorney Patented Dec. 25, 1928.

1,696,680

UNITED STATES PATENT OFFICE.

JAMES HLAVKA, OF BURKE, SOUTH DAKOTA.

PLANT GUARD FOR CULTIVATORS.

Application filed December 23, 1927. Serial No. 242,128.

The present invention relates to a guard for use on cultivators and has for its prime object to provide a structure which may be mounted on a cultivator shovel shank and will hold the plants in a standing position so as to prevent injury thereof by the cultivator shovel during windy weather or when the plants have a tendency to lean to one side or the other.

A further important object of the invention resides in the provision of a plant guard of this nature which is simple in its construction, adjustable to different angles in respect to the plant row and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawing:

Figure 1 is a front elevation of a pair of cultivating elements with my improved guard associated therewith, Figure 2 is a side elevation of one of the guards, Figure 3 is an elevation of one of the attaching means, Figure 4 is another view thereof, and Figure 5 is a perspective view of the portion thereof.

Referring to the drawing in detail it will be seen that the numeral 5 denotes a cultivator shovel with the shanks 6 rising therefrom. My guards are denoted generally by the letter G. Each guard comprises a plurality of spaced parallel bars 7 extending horizontally. The lengths of the bars gradually decreasing from bottom to top and the rear ends being in the same vertical plane so that the forward ends are in a rearwardly slanting plane. The intermediate portions of the bars are connected together by means of a strap 8 while the front ends are connected together by means of a strap 9. A runner 10 extends from the lower end of the strap 9 which terminates below the lowermost bar 7 rearwardly and is curved upwardly to provide extension 11 which is secured to an intermediate portion of the lowermost bar.

An arm 12 is provided with a base 13 bolted to the upper end of the strap 8 so that the arm extends laterally therefrom toward the respective shank 6. A pair of blocks 14 and 15 have serrated abutting faces 16 and are clamped together by an eye bolt 17 piercing openings therein so that the blocks may be clamped together by a nut 18 and the arm passing through the eye of the eye bolt may be clamped to the block 14. The block 15 is provided with a groove 19 to receive one end of a twisted strap 20 which has an opening to receive the bolt 17. The other end of the twisted strap extends alongside of the shank 6 and a plate 22 is on the other side of the shank and bolts 23 hold the plate 22 and arm 20 securely to the shank 6.

Obviously by loosening up on the bolt 17 and nut 18 the angle of the guard G may be varied in respect to the row of plants as may be desired.

It will be seen that two of the guards are used one to each side of the row of plants between the cultivating elements so that as the cultivator proceeds along the plants are maintained in a standing position no matter how hard wind may be blowing and thus the plants will not be injured by the cultivating element. These guards will also function to straighten up the plant because of the rearwardly slanting position of the forward edges thereof formed by the straps 9.

It is thought that the construction, utility and advantages of this invention will now be clearly understood without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A guard of the class described comprising a plurality of spaced parallel bars disposed horizontally in a vertical plane, the lengths of the bars decreasing upwardly in a gradual manner, said bars being disposed with their rear ends in the same vertical plane and their forward ends in an upwardly rearwardly inclined plane, and means for securing the bars in fixed relation together.

2. A guard of the class described comprising a plurality of spaced parallel bars disposed horizontally in a vertical plane, the lengths of the bars decreasing upwardly in a gradual manner, said bars being disposed with their rear ends in the same vertical plane and their forward ends in an upwardly rearwardly inclined plane, and means for securing the bars in fixed relation together, said means comprising a strap secured to the intermediate portions of the bar and a second strap secured to the forward ends thereof.

3. A guard of the class described comprising a plurality of spaced parallel bars disposed horizontally in a vertical plane, the lengths of the bars decreasing upwardly in a gradual manner, said bars being disposed with their rear ends in the same vertical plane and their forward ends in an upwardly rearwardly inclined plane, and means for securing the bars in fixed relation together, said means comprising a strap secured to the intermediate portions of the bar and a second strap secured to the forward ends thereof, the bottom end of the forward strap extending a distance below the lowermost bar, a runner secured to the lower extremity of the second strap and extending rearwardly therefrom in parallelism with the bar and terminating in an upwardly extending extension having its terminal secured to an intermediate portion of the lowermost bar.

4. A guard of the class described comprising a plurality of spaced parallel bars disposed horizontally in a vertical plane, the lengths of the bars decreasing upwardly in a gradual manner, said bars being disposed with their rear ends in the same vertical plane and their forward ends in an upwardly rearwardly inclined plane, and means for securing the bars in fixed relation together, a runner below the forward portion of the lowermost bar, and means for securing the runner in fixed relation to said lowermost bar.

In testimony whereof, I affix my signature.

JAMES HLAVKA.